US00RE40737E

(19) United States
(12) Reissued Patent
Firestone

(10) Patent Number: US RE40,737 E
(45) Date of Reissued Patent: Jun. 16, 2009

(54) TRAFFIC CONTROL SIGNAL WITH DISPLAYED TIME-ELAPSE

(76) Inventor: Paul A. Firestone, 155 W. 68th St., New York, NY (US) 10023

(21) Appl. No.: 10/738,698

(22) Filed: Dec. 16, 2003

Related U.S. Patent Documents

Reissue of:
(64) Patent No.: 6,331,824
Issued: Dec. 18, 2001
Appl. No.: 09/635,623
Filed: Aug. 10, 2000

(51) Int. Cl.
*G08G 1/096* (2006.01)

(52) U.S. Cl. ..... 340/929; 340/309.4; 340/944; 340/925; 340/907

(58) Field of Classification Search ..... 340/929, 340/925, 944, 907, 309.4, 923
See application file for complete search history.

(56) References Cited

U.S. PATENT DOCUMENTS

| | | | | | |
|---|---|---|---|---|---|
| 3,234,506 | A | | 2/1966 | Hines | 340/929 |
| 3,302,170 | A | | 1/1967 | Jensen | |
| 3,320,585 | A | | 5/1967 | Hines | 340/929 |
| 3,764,973 | A | * | 10/1973 | Muramatu et al. | 340/915 |
| 4,200,860 | A | | 4/1980 | Fritzinger | 340/929 |
| 4,827,258 | A | | 5/1989 | Evans | 340/929 |
| 5,519,390 | A | * | 5/1996 | Casini | 340/929 |
| 6,054,932 | A | * | 4/2000 | Gartner et al. | 340/815.65 |
| 6,087,962 | A | * | 7/2000 | Rojas | 340/907 |
| 6,100,819 | A | | 8/2000 | White | |
| 6,268,805 | B1 | | 7/2001 | Simon | |
| 6,987,962 | B1 | * | 1/2006 | McConnell | 455/413 |

FOREIGN PATENT DOCUMENTS

| | | |
|---|---|---|
| CH | 678668 | 10/1991 |
| DE | 2911507 | 10/1979 |
| DE | 2933774 | 3/1981 |
| WO | 9954855 | 10/1999 |

* cited by examiner

*Primary Examiner*—Benjamin C Lee
*Assistant Examiner*—Daniel Previl
(74) *Attorney, Agent, or Firm*—Lucas & Mercanti, LLP

(57) ABSTRACT

A transparent lens for motorist traffic light signals and pedestrian "Don't Walk" signs that displays, in Lcd countdown "real-time", how much time remains before the traffic signal command will change. The lens is easily shaped to be adapted over any existing traffic control device or magnified over the existing control device and works in conjunction with existing technology for timing and control settings to provide a quick and economical installation. The covering lens is a traffic light signaling device combination manufactured as one assembly and comprised of known colored liquid crystal (LED), plasma or pixel generators or other imaging generating technology which is quickly affixed to existing signaling traffic devices.

6 Claims, 2 Drawing Sheets

TRAFFIC CONTROL SIGNAL WITH DISPLAYED TIME-ELAPSE

Matter enclosed in heavy brackets [ ] appears in the original patent but forms no part of this reissue specification; matter printed in italics indicates the additions made by reissue.

BACKGROUND OF THE INVENTION

The invention relates to a new and novel method for signaling and controlling traffic flow by means of an electric device, or the like.

Efforts to control pedestrian and vehicular patterns for safe passage at areas where opposing movements occur have largely been restricted to (1) electric devices known as traffic lights or (2) traffic-control directed by human personnel.

Current systems of traffic light control devices do not allow (1) pedestrians to anticipate the actual time span for expedient and safe crossing or (2) for motorists to approach and pass warning signals with safety through intersections. This invention affords a real-time signal to the motorist to apply his brakes allowing him to make the appropriate judgment to avoid intersection gridlock. The "real-time" signal informs the motorist to anticipate the time-changing of a traffic signal from "go" to "stop", thereby preventing his entering and passing the intersection on a "yellow" signal.

Current methods do not allow pedestrians to anticipate the time span for expedient and safe crossing. This invention provides real-time countdown for pedestrian or vehicular cross-over.

Originally, traffic control devices contained only red and green signals. Safety concerns then required the addition of a "yellow" signal to provide an added element of safety. Other safety measures followed, including blinking signals and icons as warnings of a signal change. Despite this intense consideration for traffic safety, the current light-changing "red-yellow-green" and "icon" systems remain an un-safe element of guesswork for the pedestrian and vehicle driver.

The present new and novel device and method of signaling pedestrians and vehicles eliminates the guesswork associated with safe passage.

The inventor is aware of the following U.S. Patents which show efforts made to solve some of the problems described above: U.S. Pat. Nos. 6,100,819; 6,087,962; 6,054,932; 3,764,973; 3,302,170.

Though traffic devices have attempted to provide safety in directing the flow of pedestrian and vehicular traffic, the traffic flow participants are not informed as to the pending signal change wherever signals are placed. The absence of time-related information presents an unsafe condition since motorists and pedestrians must rely on guessing and/or hopeful anticipation for sufficient time for passage. Guessing has led to improper and dangerous movement. The present invention solves the problem of the current lack of "real-time" elapse information to motorists and pedestrians to negotiate any intersection with safety.

SUMMARY OF THE INVENTION

The invention relates to control devices generally used to facilitate the orderly movement of pedestrians and vehicles, most often at points where non-parallel streets intersect.

This invention relates to a unique and novel device and method that allows for a "real-time" elapse or countdown—most probably a "numerical" countdown—of each successive operating signal, indicating vehicular "stop", vehicular "go" and pedestrian "walk" to provide information for complete safe passage.

Each street and/or intersection can be uniquely programmed to coordinate with each other in unison or set in appropriate patterns to deal with special traffic situations. Housed in or about the lighted surface, the instant invention provides for a method and device for controlling vehicular and pedestrian traffic, eliminating guesswork relative to time in the control of pedestrian and vehicular movement.

The invention provides for an environment that informs all pedestrians and/or vehicle operators with the "real-time" elapse or countdown, better informing the participant so as to adhere to lawful traffic regulations.

As stated earlier, historically, a person or vehicle has not been advised of the length of time to remain in a stopped position. Only an angled view of the opposing signal or a time-tested familiarity with the specific intersection mechanism could provide information to the vehicle operator or the pedestrian.

The instant invention informs a clear and fool-proof mechanism, and method of same, that advises, in "real-time", the time remaining of the predominant signal.

For example, as soon as a red light is activated, an intrinsic part of the red light begins a countdown in "real-time." When the red light countdown is completed and ceases to be illuminated, the green signal is illuminated with the intrinsic display advising "real-time" elapse.

BRIEF DESCRIPTION OF THE DRAWINGS

The features of the present method which are believed to be novel are set forth by description within this application and may best be understood with reference to the accompanying drawings in which.

DETAILED DESCRIPTION OF THE INVENTION

Figure 1:
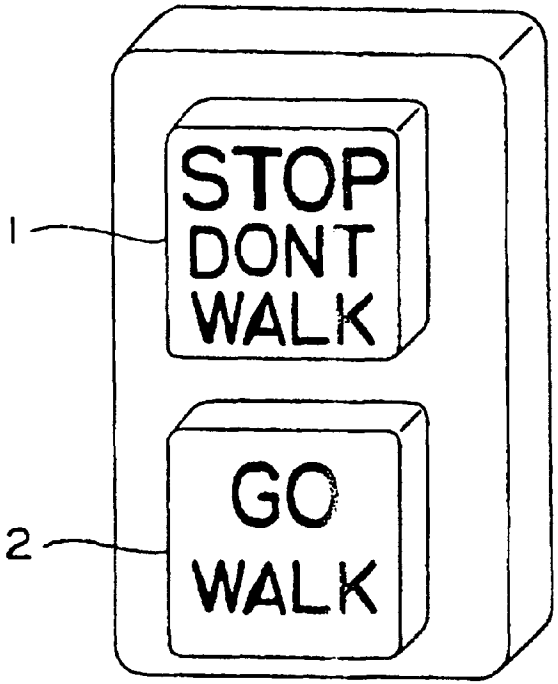
FIG. 1 shows the old method of traffic "stop" and "go."

A traffic control signal with displayed time-elapse wherein a traffic control device FIG. 1, contains a red light STOP 1, and a green light GO 2.

Figure 2:
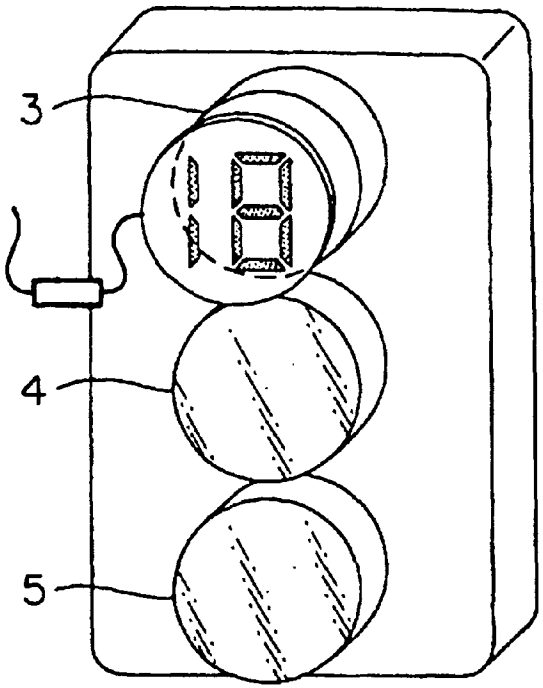
FIG. 2 through FIG. 6 show the invention's progress of "real-time" elapse and light change.
Figure 3:
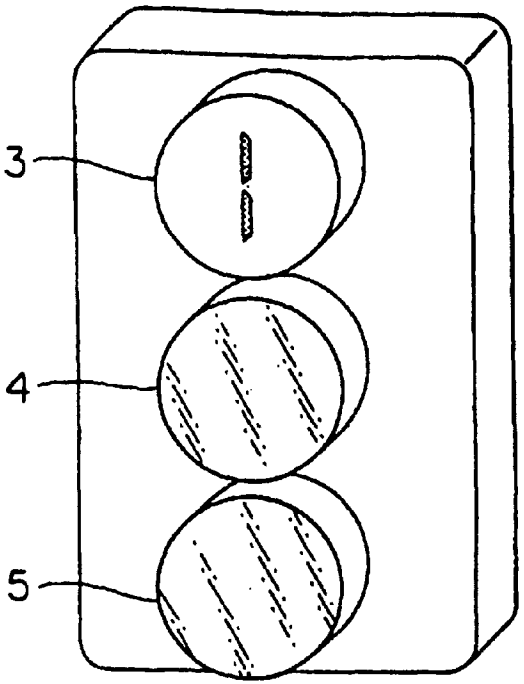
Figures 4, 5, 6:
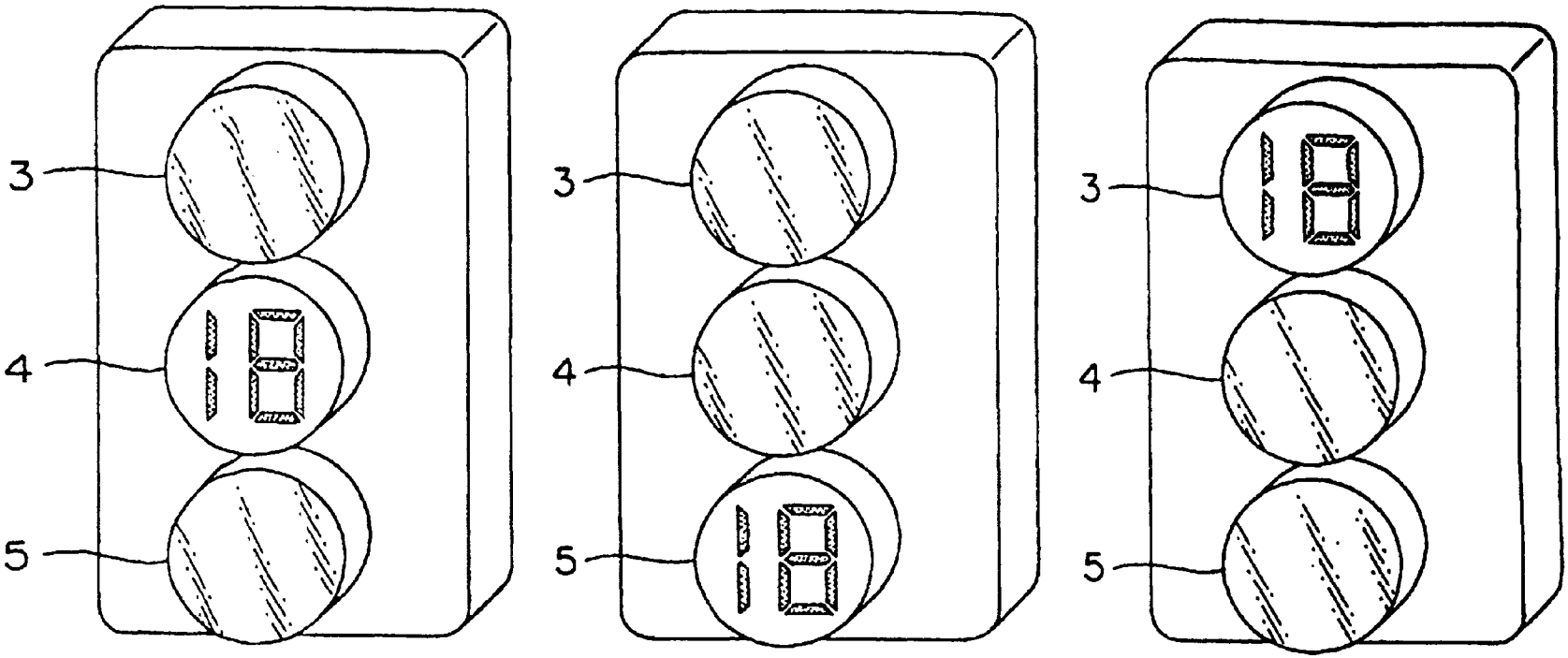

The instant invention provides for the illuminated light 3, in FIG. 2, in which appears a variable number (herein designated "18") to begin a descending-to-1 advisement indicating the "real-time" remaining in seconds . . . before FIG. 3 as the red light 3 countdown to 1 and becomes dark . . . and FIG. 4 shows the yellow light 4 illuminated and indicating 18 seconds in countdown-to-1 at which time, the yellow light goes dark and . . .

FIG. 5 indicating the green light 5 illuminated with 18 seconds in a countdown-to-1 at which time the green light goes dark and . . .

FIG. 6 indicates the red light 3 illuminated with 18 seconds in a countdown-to-1 at which time the red light goes dark and the sequences follow as set forth.

The progression from green-to-yellow-to-red light operates in a fashion which constantly advises the time remaining in the predominant (or illuminated, or active) signal.

I claim as my invention:

1. A traffic light for pedestrians' and vehicle operators' safety, comprising:

a traffic light device having a housing with *one or more* lighted surfaces to convey directive and active signals for directing traffic flow;

a uniquely programmed device aligned with said housing and in or about each lighted surface to provide a "real-time" advisement of the time remaining in which the directive and active signal(s) is displayed;

wherein said "real-time" advisement comprises an icon in the form of one of graphical, numerical or other known advisory or signatory communication reveals the time remaining as part of the associated signal;

wherein one or more of the signals meant to relay a directive message comprises, as part of that signal, a mechanism for visual representation that advises the "real-time" that signal is to remain in the current state of advisement*; and*

*wherein said "real-time" advertisement and said directive and active signal associated with said "real-time" advertisement are in a single lens*.

2. A traffic light as in claim 1, further comprises a plurality of traffic light devices and corresponding aligned uniquely programmed devices located on a plurality of streets and intersections, wherein each uniquely programmed device coordinates with each of the others of the plurality of uniquely programmed devices.

3. A traffic light as in claim 1, wherein the traffic light devices further comprises sound signals.

4. A method for signaling traffic, comprising:

aligning a "real-time" display lens to the light(s) of an existing traffic signal that provides traffic flow advisement providing a status indication to remain in its current condition of advisement by said "real-time" display; the "real-time" elapse indication being an intrinsic, integral part of the signal; wherein the "real-time" display advises elapsed time; and operates in conjunction with signal switching timing technology*; and said "real-time" elapse indication and the traffic signal associated with said "real-time" elapse indication are in a single lens*.

5. A method for signaling traffic as in claim 4, further comprises placing a plurality of traffic light devices and corresponding aligned uniquely programmed devices at a plurality of streets and intersections, wherein each uniquely programmed device coordinates with each of the other ones of the plurality of uniquely programmed devices.

6. A method for signaling traffic as in claim 4, wherein the traffic signal further comprises sound signals.

* * * * *